(12) United States Patent
Jaffery et al.

(10) Patent No.: US 11,756,106 B1
(45) Date of Patent: Sep. 12, 2023

(54) SYSTEM AND METHOD FOR PERSONALIZED PORTAL INTERFACE

(71) Applicant: QuBit Digital Ltd., Covent Garden (GB)

(72) Inventors: Simon Jaffery, London (GB); Karolis Narkevicius, London (GB); Alan Clarke, London (GB); Giovanni Luperti, London (GB); Graham Cooke, London (GB); Emre Yavuz Baran, London (GB)

(73) Assignee: QuBit Digital Ltd., Covent Garden (GB)

( * ) Notice: Subject to any disclaimer, the term of this patent is extended or adjusted under 35 U.S.C. 154(b) by 158 days.

(21) Appl. No.: 15/987,128

(22) Filed: May 23, 2018

Related U.S. Application Data

(60) Provisional application No. 62/511,683, filed on May 26, 2017.

(51) Int. Cl.
*G06Q 30/00* (2023.01)
*G06Q 30/0601* (2023.01)

(52) U.S. Cl.
CPC ..... *G06Q 30/0641* (2013.01); *G06Q 30/0631* (2013.01)

(58) Field of Classification Search
CPC .......................... G06Q 30/0641; G06Q 30/0631
USPC ...................................................... 705/26.7
See application file for complete search history.

(56) References Cited

U.S. PATENT DOCUMENTS

| | | | | |
|---|---|---|---|---|
| 8,234,375 B2* | 7/2012 | Ghadialy | ............... | G06Q 30/02 705/14.49 |
| 2002/0049974 A1 | 4/2002 | Shnier | | |
| 2002/0188527 A1* | 12/2002 | Dillard | ............... | G06Q 30/0601 705/26.1 |
| 2008/0077462 A1* | 3/2008 | Patel | .................... | G06Q 20/108 705/7.29 |
| 2008/0201225 A1* | 8/2008 | Maharajh | ................ | H04L 67/30 705/14.43 |
| 2011/0119150 A1 | 5/2011 | Kane, Jr. | | |
| 2011/0184813 A1* | 7/2011 | Barnes | ................ | G06F 16/9535 705/14.66 |
| 2012/0158516 A1* | 6/2012 | Wooten, III | ....... | G06Q 30/0269 705/14.66 |

(Continued)

OTHER PUBLICATIONS

Eirinaki, M., Vazirgiannis, M., Web Mining for Web Personalization, Feb. 2003, ACM Transactions on Internet Technology, vol. 3, No. 1, pp. 1-27. (Year: 2013).*

(Continued)

*Primary Examiner* — Jeffrey A. Smith
*Assistant Examiner* — Brittany E Bargeon
(74) *Attorney, Agent, or Firm* — Fish & Richardson P.C.

(57) ABSTRACT

Among other things, a computing system receives data from a user device. The data may be about one or more users and can indicate one or more content preferences associated with a first user. The computing system also receives provider data from a provider system. The provider data may be about one or more products that are offered for procurement from the provider. The computing system stores the provider data about the one or more products and at least a subset of the data about the one or more users in a memory of the system. The computing system generates a user-specific interface that is provided for output to the user device. The user-specific interface is generated using the data about at least one product and based on at least one content preference of the first user.

19 Claims, 9 Drawing Sheets

(56) References Cited

U.S. PATENT DOCUMENTS

| | | |
|---|---|---|
| 2013/0173509 A1 | 7/2013 | Bjork |
| 2013/0226710 A1* | 8/2013 | Plut .................... G06Q 30/02 |
| | | 705/14.67 |
| 2013/0339839 A1* | 12/2013 | Baran ............... G06F 11/3438 |
| | | 715/255 |
| 2014/0122220 A1* | 5/2014 | Bradley ............ G06Q 30/0243 |
| | | 705/14.42 |
| 2014/0201038 A1 | 7/2014 | Minnis |
| 2014/0297430 A1* | 10/2014 | Rezvani ............ G06Q 30/0276 |
| | | 705/14.72 |
| 2015/0012363 A1* | 1/2015 | Grant ................ G06Q 30/0269 |
| | | 705/14.66 |
| 2015/0112836 A1 | 4/2015 | Godsey |
| 2015/0262286 A1* | 9/2015 | Cypher ............. G06Q 30/0261 |
| | | 705/26.61 |
| 2015/0371274 A1 | 12/2015 | Bauman et al. |
| 2016/0140622 A1* | 5/2016 | Wang .................... G06Q 50/01 |
| | | 705/14.66 |
| 2016/0140633 A1* | 5/2016 | Hiller ................ G06Q 30/0609 |
| | | 705/26.35 |
| 2016/0253710 A1* | 9/2016 | Publicover ......... H04N 21/4532 |
| | | 705/14.66 |
| 2017/0185894 A1 | 6/2017 | Volkovs |

OTHER PUBLICATIONS

Eirinaki, M., Vazirgiannis, M., Web Mining for Web Personalization, Feb. 2003, ACM Transactions on Internet Technology, vol. 3, No. 1, pp. 1-27. (Year: 2003).*

* cited by examiner

SYSTEM AND METHOD FOR PERSONALIZED PORTAL INTERFACE

CROSS-REFERENCE TO RELATED APPLICATIONS

This application claims the benefit of, and claims priority to, U.S. Provisional Application Ser. No. 62/511,683, filed on May 26, 2017.

BACKGROUND

This description relates to generating a personalized portal interface for one or more users. Most users access the Internet and other networks from a computer system using a web browser. Users interact with the web browser through a variety of means. A user may input a Uniform Resource Locator (URL) address into the web browser's URL bar to directly access a webpage of a website having an address known to the user.

Sometimes a user may utilize a web browser to locate retail products that the user wishes to purchase. Once a user has accessed a webpage, the user may interact with the webpage by using a mouse or other input device. When using a device, such as a smartphone or tablet computer, the user may use touch input to interact with the webpage to navigate a web resource to identify or locate certain products. Interaction can include selection of certain retail or consumer products that are offered for sale by a consumer product provider.

SUMMARY

According to the described technologies, a computing system receives data from a user device. The data may include information about one or more users and may also indicate one or more content preferences associated with the one or more users. The system can receive provider data from a provider system. The provider data can include information about one or more products that are offered for procurement from the provider.

The computing system stores, in a memory of the system, the provider data and at least a subset of the data that includes information about one or more users. The system generates a user-specific interface that can be provided for output to a user device. The user-specific interface can be generated using data that includes information about at least one product offered from the provider and based on at least one content preference associated with a user.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These and other aspects, features, and implementations, and combinations of them, may be expressed as apparatus, methods, methods of doing business, means or steps for performing functions, components, systems, program products, and in other ways.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 3A, 3B—FIG. 7 each show an example of a personalized portal interface.

Like reference numbers and designations in the various drawings indicate like elements.

DETAILED DESCRIPTION

Website operators for retail outlets and other product providers sometimes collect data about how users interact with a provider website. For example, a product provider may want to know which portions of webpages that users spend the most or least amount of time looking at or interacting with. Among other purposes, the product provider can use this information to determine which products, product categories, or portions of webpages that display certain products are popular and unpopular with users. In response, the product provider can make adjustments to the content and layout of webpages to maximize user attention upon particular products that are displayed via certain portions of the provider's webpages.

One way to maximize user attention is to dynamically alter the content the content of a web resource or page such that each user is presented with a customized version of a page, or a given user is presented with different versions of a page or different elements on the page at different times. As described in further detail below, webpages for retail product providers can be configured to generate personalized or user-specific interfaces. The personalized interface can be uniquely configured to display product content that aligns with certain identified preferences or interests of an example user.

Figure 1:
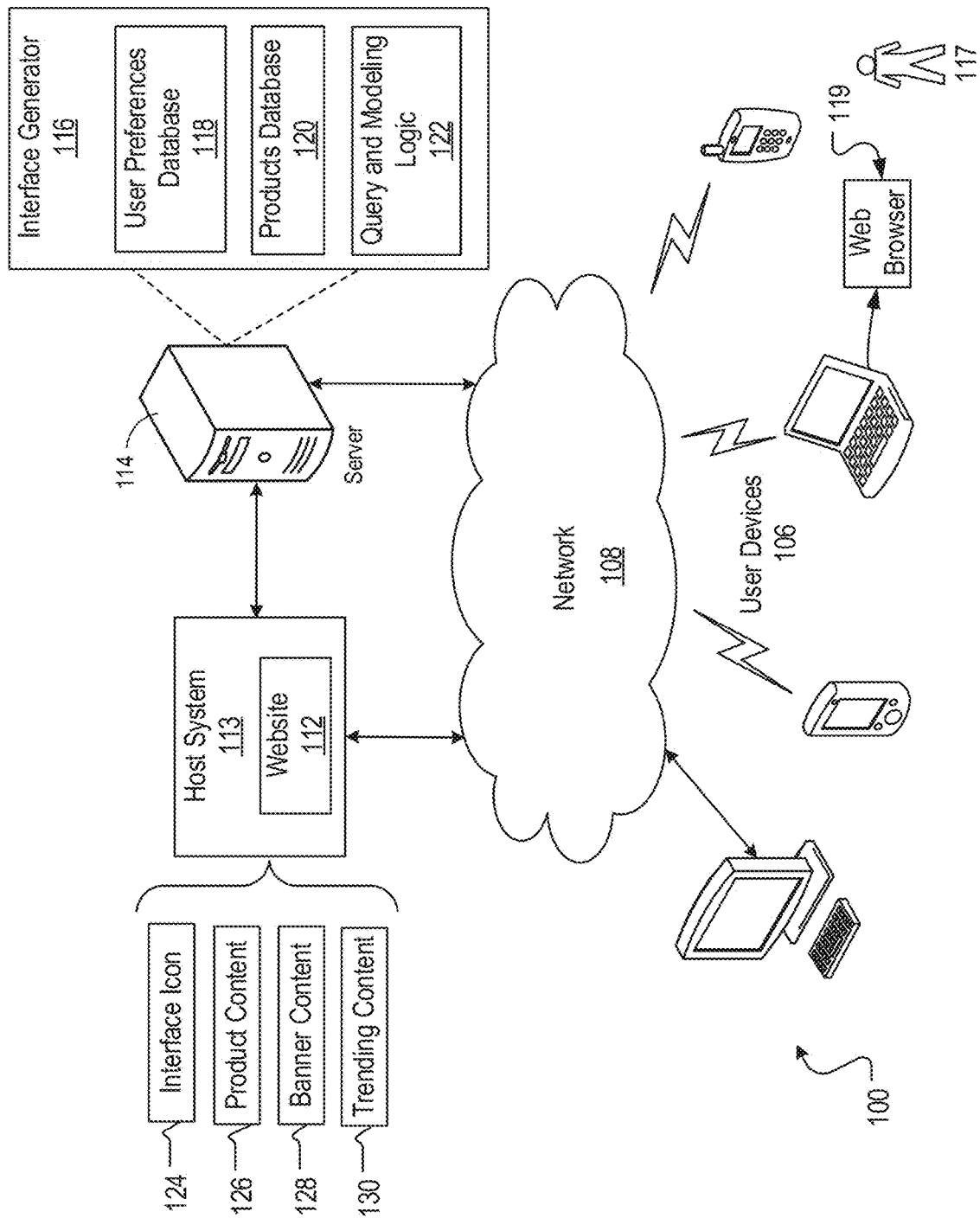
FIG. 1 shows an example computing system for generating a personalized portal interface.

FIG. 1 is a block diagram of an example computing system 100 for generating a personalized portal interface. The system 100 generally includes user device(s) 106, website 112, host system 113, and server 114. As shown, network 108 provides a communication path that enables data communications to be exchanged between at least one user device 106 and provider website 112 (via host system 113) or between at least one user device 106 and computing device/server 114.

In some implementations, user device 106 can be a computer, laptop, mobile telephone, tablet computer, personal digital assistant, television, touchscreen computer, or other device that can access a network. In some implementations, user device 106 can access network 108 through a wired connection. In some implementations, user device 106 can access network 108 through a wireless connection (e.g., WiFi, WiMax, or another type of wireless connection).

Website 112 can be an example provider website configured to display consumer products and other retail products that may be offered for purchase to a user by an example product provider or retail outlet. For example, web site 112 can be one of variety of webpages or web resources that display graphical representations of consumer products, such as, fashion apparel, sporting equipment, digital content, or consumer electronic devices. In particular, web site 112 can be one of multiple of webpages that are configured to process consumer transactions relating to the procurement of various consumer products.

In general, web browser 119 operates on user device 106 and user 117 can use web browser 119 to communicate with, or to access, web site 112 using network 108, e.g., the Internet. In some implementations, server 114 is configured to receive information about user's 117 interactions with website 112. For example, server 114 can receive information directly from web site 112 that indicates, specifies, or otherwise describes details about user's 117 interactions with web site 112. Alternatively, server 114 can receive, through network 108, information or data from website 112 that describe user interactions with web site 112.

Server 114 can receive or transmit data signals, e.g., non-transitory propagating signals, for exchanging data communications with an example host server/system 113, or related device, used to generate web site 112. As shown, server 114 includes an interface generator 116, and interface generator 116 can include, or be configured to access, a user preferences database 118, a products database 120, and an example module that includes query and modeling logic 122. In some implementations, server 114 can include additional or fewer modules or databases and system 100 can include one or more additional servers or computing devices.

As used in this specification, the term "module" is intended to include, but is not limited to, one or more computers configured to execute one or more software programs that include program code that causes a processing unit(s) of the computer to execute one or more functions. The term "computer" is intended to include any data processing device, such as a desktop computer, a laptop computer, a mainframe computer, a personal digital assistant, a server, a handheld device, a tablet device, or any other device able to process data.

In general, described actions or functions of user device 106, server 114, and modules associated with interface generator 116 can be enabled by computing logic or software instructions that are executable by a processor and memory associated with these electronic devices. For example, user device 106, server 114, and generator 116 (collectively "devices of system 100") can each include one or more processors, memory, and data storage devices that form a computing system of each device. Execution of the stored software instructions can cause one or more of the actions described herein to be performed by the devices of system 100.

In other implementations, multiple processors may be used, as appropriate, along with multiple memories and types of memory. For example, user device 106 or server 114 may be connected with multiple other computing devices, with each device (e.g., a server bank, groups of servers, or a multi-processor system) performing portions of the actions or operations associated with the various processes or logical flows described in this specification.

Referring again to FIG. 1, server 114 can receive multiple user datasets from host system 113, or a related provider data system. The user datasets can include information indicating user preferences that are associated with a variety of users. The users can be consumers that regularly purchase provider products and/or other related content using provider website 112. In some implementations, the user datasets can include user content preferences which indicate particular content items or provider products that certain individual users have indicated a unique interest in purchasing. Multiple user datasets can be saved at user preferences database 118.

Server 114 can also receive multiple content/product datasets from host system 113. These content datasets can include information about item details associated with a variety of products offered for purchase by an example retail store or content provider. For example, the items can be consumer products, or online digital content, that are regularly or routinely purchased by respective users through website 112. In some implementations, the content datasets can include apparel products, such as designer jeans, luxury handbags, dress shoes, or sport coats. In other implementations, the content datasets can include items of media content, such as digital movies files, digital music files, digital audio books, streaming video content, or other related media content. Multiple content datasets can be saved at product database 120.

Logic module 122 can include program code or compute logic for analyzing user preference data associated with database 118 and associate one or more user preferences of respective users with products, product categories, or product subsets that are stored within products database 120. In some implementations, logic module 122 includes program code configured to implement at least one real-time event processing pipeline.

For example, server 114 can receive user session data from host system 113. The session data can correspond to the browsing activities of certain users. The browsing activity may include real-time user queries received by host system 113 based on user interactions with website 112. Server 114 may also receive one or more data events that are tracked by host system 113 as being related to the browsing activity of certain users. Logic module 122 can be configured to enrich the session data using information relating to the data events tracked by host system 113.

For example, logic module 122 can use data events that indicate one or more referrer categories (e.g., Google search data), geo-tagging data (e.g., IP Address showing user is located in U. S./New York City), and other meta data relating to individual users to enrich session data about the user. In some implementations, session data is enriched and then stored in a storage medium that is accessible by computing system 100. For example, enriched session data can be stored as structured datasets using one or more commercial cloud platforms.

Structured datasets stored within the commercial cloud platforms can be accessed and/or queried by server 114. In response to accessing/querying the data, logic module 122 can be used to analyze the data or query results to generate one or more user preference models. For example, the session data can be analyzed or queried to determine particular users that indicate an interest or preference for purchasing luxury handbag products provided by an example retailer.

In particular, an example user preference model can be generated to quickly identify user subsets and associate certain products with certain users within a subset. Hence, logic module 122 can be used by server 114 to encode user preference models and the models can be used to efficiently identify particular luxury handbag products within database 120. The luxury handbags can then be associated with a certain subset of users and provided for display to users in a subset that have a demonstrated preference for the particular luxury handbag product.

As described in more detail below, at least one user preference model can be used by interface generator 116 to generate respective personalized interfaces for output to user device 106. For example, web content can be presented for display using website 112 through web browser 119 running on user device 106. The web content can include an interface icon 124, product content 126, banner content 128, and trending content 130. When a user browses web site 112, selection of interface icon 124 causes interface generator 116 to generate a personalized portal interface.

The personalized portal interface can include web content such as product content 126, banner content 128, and trending content 130. In general, a webpage of web site 112 usually defines the web content using a markup language such as HTML or XML. Each of interface icon 124, product content 126, banner content 128, and trending content 130 are described in more detail below with reference to FIG. 2 through FIG. 7.

Figure 2:
FIG. 2 shows an example user interface.

FIG. 2 shows an example user interface that can be generated for display via user device 106. In the implementation of FIG. 2, user device 106 is a mobile smart phone device. However, as noted above, in alternative implementations user device 106 can be a computer, laptop, mobile telephone, tablet computer, personal digital assistant, television, touchscreen computer, or other device that can access a network.

A display of user device 106 can generate an example user interface 202. Interface 202 can include graphical representations of custom provider content. The custom content can show consumer retail products and services as well as digital and other media content items that are offered for purchase from certain providers or retail outlets. For example, interface 202 can be associated with website 112 and user 117 can browse website 112 via interface 202 to identify and select apparel items user 117 wants to purchase from a particular apparel provider.

As described in more detail below, when user 117 views web content associated with interface 202, interface icon 124 can be presented as an overlay relative to custom provider content that is generated for display using interface 202. As described herein, interface icon 124 provides a portal/channel that can be configured, designed, or programmed to appear as a graphical icon that is overlaid on top of webpage content of web site 112.

In some implementations, interface icon 124 can be designed for display as an icon positioned at any desired location (e.g., lower right, upper left, etc.) of a viewing window of interface 202. Interface icon 124 can be designed to have color features that are user-configurable or user-adjustable. Additionally, an image icon shape, or outline, of interface icon 124 can be designed to appear as a flat two-dimensional (2-D) icon or to appear as a three-dimensional (3-D) icon.

In some implementations, web site 112 can include a main or primary webpage (e.g., a homepage) and at least one sub-page (e.g., a listing page) that is generally accessible from the primary webpage. Interface 202 may show homepage web content or listing page web content, and interface icon 124 can be displayed as an overlay relative to the various web content that is generated for display via interface 202. In some implementations, interface icon 124 can be displayed as an overlay on top of web content for a variety of webpages produced by web site 112.

FIGS. 3A, 3B, 4A, and 4B each show an example of a personalized portal interface 204 that can be generated for display via user device 106. A personalized portal interface is a user-specific interface that includes graphical representations of product and other content items 206 that aligns with, or that are consistent with, one or more preferences of user 117.

When user 117 browses website 112, selection of interface icon 124 causes interface generator 116 to generate a personalized portal interface. In general, interface icon 124 can be selected when user 117 clicks on icon 124. Alternatively, if user device 106 includes a touchscreen display, interface icon 124 may be selected when user 117 taps on the touchscreen display in an area of the display where interface icon 124 is visible.

As shown by banner 205, the personalized portal interface can be a "companion" interface or portal that is associated with one or more webpages of a particular product/content provider's web site 112. Banner 205 can include heading or text content that identifies interface 204 as a "personal [brand] companion" for a particular user.

Banner 205 may also include an indicator 207 to indicate additional banner content is available for viewing by a user. Selection of indicator 207 opens a sub-menu of interface 204 to show the additional banner content. In some instances, a color of text shown via banner 205 (e.g., header/bar text) can be adjustable by modifying one or more property attributes of interface 204 or banner 205.

In some implementations, banner 205 can correspond to a top bar of a personalized user-specific portal webpage. Selection of the top bar (e.g., by clicking/tapping the top bar) can close the personalized webpage experience provided by interface 204 and returns the user to a previous provider hosted webpage, e.g., returns to the user interface 202.

Figure 3B:
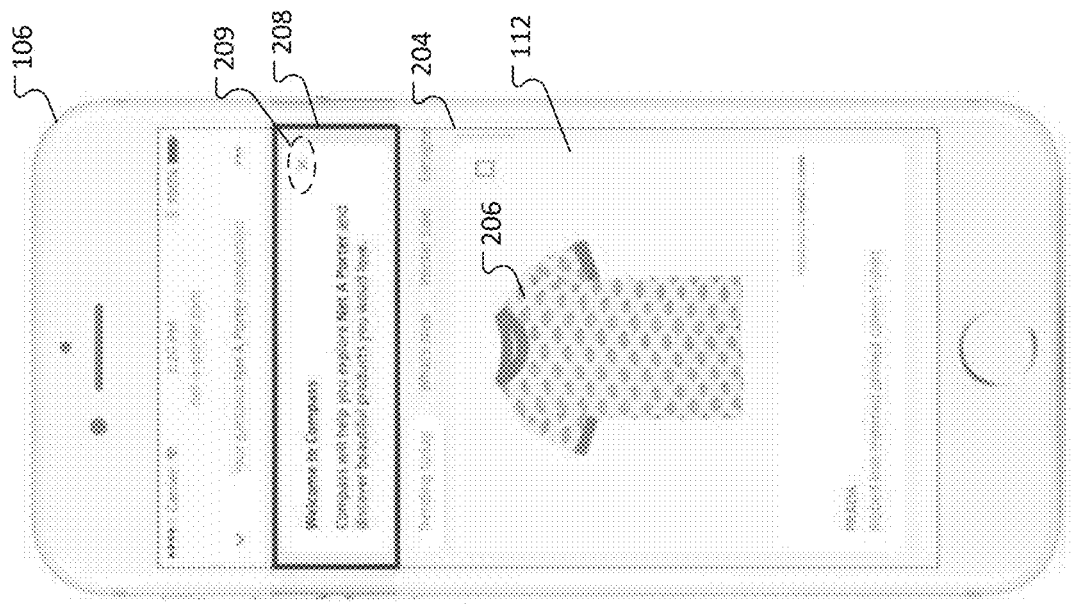
Figure 3A:
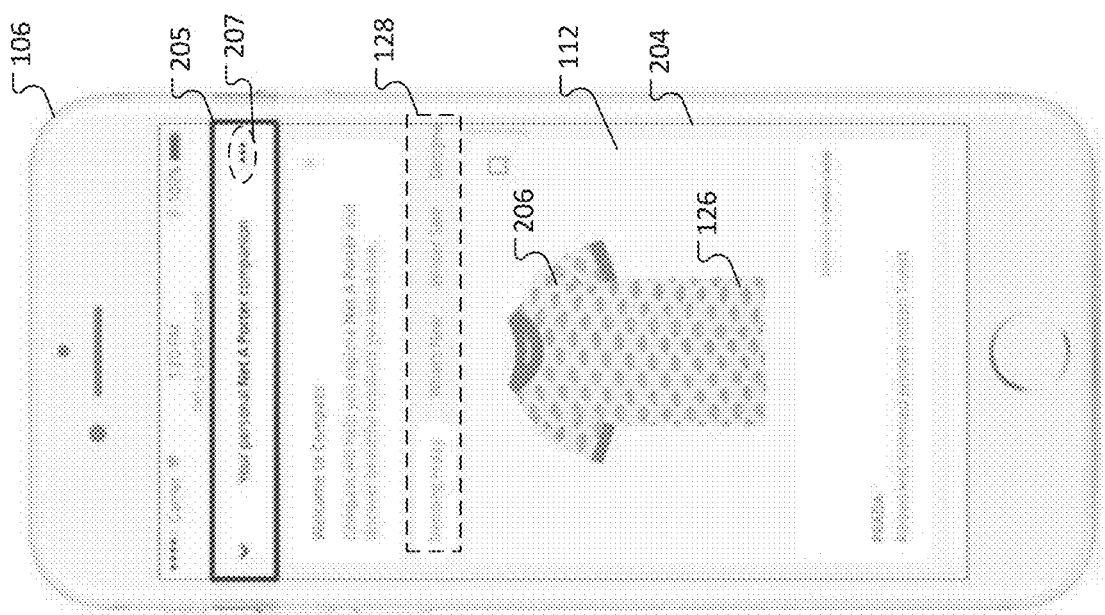

As shown in FIG. 3A, "Net A Porter" can be an example product provider or retail outlet that hosts the Net A Porter website 112 via host system 113. Interface 204 may be a personalized interface that functions as a companion portal which enables users to access user-specific product content offered for sale by Net A Porter. Interface 204 can be configured to show products or content items 126 that are similar to, substantially similar to, or identical to, content items that are accessible via website 112.

Interface 204 can be further configured to show banner content 128. In some implementations, banner content 128 includes one or more user-selectable options that enable a user to access particular types of content items. In some implementations, interface 204 can be configured to show content items that are associated with different product or content categories (e.g., shoes, shirts, electronics, sports gear, etc.).

Banner content 128 can include: i) a selectable option identified as "Trending Today" for access to content items that are trending amongst multiple customers/users; ii) a selectable option identified as "What's New" for access to new content items; iii) a selectable option identified as "Winter Sale" for access to content items that are on-sale and that have an association with the winter season; and iv) a selectable option identified as "Designer" for access to designer content items.

Selectable options for banner content 128 depicted in FIG. 3A are merely examples and interface 204 can be configured to include a variety of different types of selectable options for inclusion within banner content 128.

As shown in FIG. 3B, interface 204 can be configured to include a customizable welcome message 208. Message 208 may be presented for display to a user when the user selects interface icon 124 and system 100 causes interface generator 116 to present a personalize user-specific interface (i.e., interface 204) to the user. Interface 204 may display message 208 upon initial launch of a personalized user-specific interface and a user can dismiss message 208 in response to user selection of feature 209.

In some implementations, once dismissed, message 208 does not reappear. While in other implementations, message 208, and other related messages, can be configured to initially appear and reappear periodically as desired based on user defined, or programmed, properties of interface 204. Text of message 208 can be configured to include particular text content that aligns with one or more user/customer defined preferences.

Figure 4B:
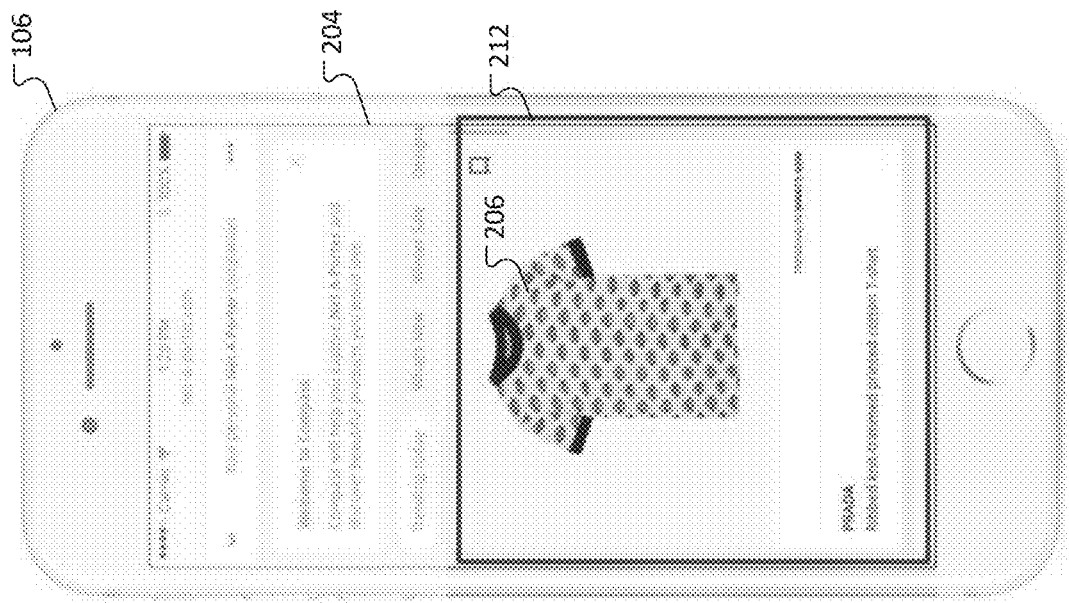
Figure 4A:
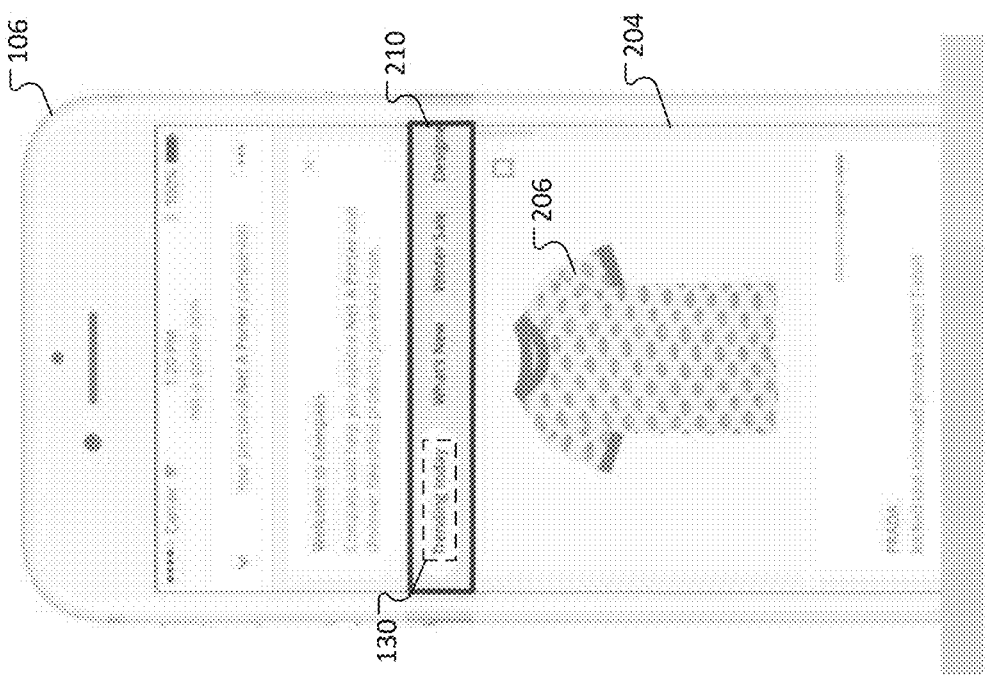

As shown in FIG. 4A, interface 204 can include identified banner content 210. In some implementations, system 100 includes context-aware navigation logic for updating information that is presented for display to user 117. The navigation logic can detect navigation changes and can be used to modify or adjust identified banner content 210 based on learned inferences about the user's context as the user navigates webpages of website 112.

For example, users that are first time arrivals to an example personalized interface 204, from a product provider's homepage, can be shown a user-selectable option identified as "Trending today." As noted above, selection of the "Trending today" option by a user provides the user with access to content items that are trending today amongst multiple customers/users. In a related example, users that arrive to interface 204 from a "Shoe" product listing page (PLP) can be shown "Shoe" products as a first item.

In some implementations, the ordering of product or contents items that are Trending today, or content items that are shoe (or other) products, may change based on the use of machine learning logic for determining inferences about an example user, such as user 117. For example, system 100 can use machine learning logic associated with logic module 122 to predict or determine certain content item categories that align with one or more preferences of user 117 based on analysis of user preferences data about user 117.

Hence, if system 100 predicts that user/customer 117 has a preference for blue or black jackets, then blue or black jackets (or other related jacket colors) will be presented for display to the user via interface 204.

As described herein, methods implemented by system 100 can provide improved ordering of products displayed via a personalized interface. For example, graphical representations of multiple products can be based on a determined likelihood that a particular user/customer will be interested in these products. The determination can be made by system 100 based on analysis of data about users' preferences (e.g., user likes red shoes). The determination can also be made based on analysis of relationships between at least a first user preference and at least one other corresponding user preference (e.g., red shoes are related to certain socks and accessories).

As shown in FIG. 4B, interface 204 can include an example product card 212 that includes example product content 206. Product card 212 can be a clear and focused product card that focuses on a particular proposition (e.g., a core proposition). For example, product card 212 can be designed to present a clear product view of a main or core product image. In some implementations, product card 212 can include descriptive text or other context information that is presented to aid a user with obtaining a better understanding of why a particular product card 212 is being shown to the user.

For example, product card 212 can include descriptive text to indicate that a particular product is "Trending in" the "What's New" product category. In other implementations, product card 212 can include descriptive text to indicate that a particular product has been, or is being, viewed by [N] number of customers/users, or that a particular product is being included in product card 212 based on one or more items that were recently viewed by the user.

Product card 212 can include the name of the product and can include one or more interactive or click through features. For example, user interaction that includes selecting or clicking the indicated product category can cause interface 204 to transition from displaying product card 212 to displaying a product listing page. The product listing page can include multiple products or content items that are associated with the indicated product category (e.g., other items that are trending in the "What's New" category).

In a related example, user interaction that includes selecting or clicking the indicated product can cause interface 204 to transition from displaying product card 212 to displaying a product display page. The product display page can include multiple products or content items that are associated with the indicated product type (e.g., other Prada shirts). The product display page can be configured such that the user can pick certain products that are of particular interest to the user. In some implementations, content items displayed via the product display page can be ordered based on the products determined popularity within a past time period (e.g., within past 24 hours, week, month, etc.).

Figure 5:
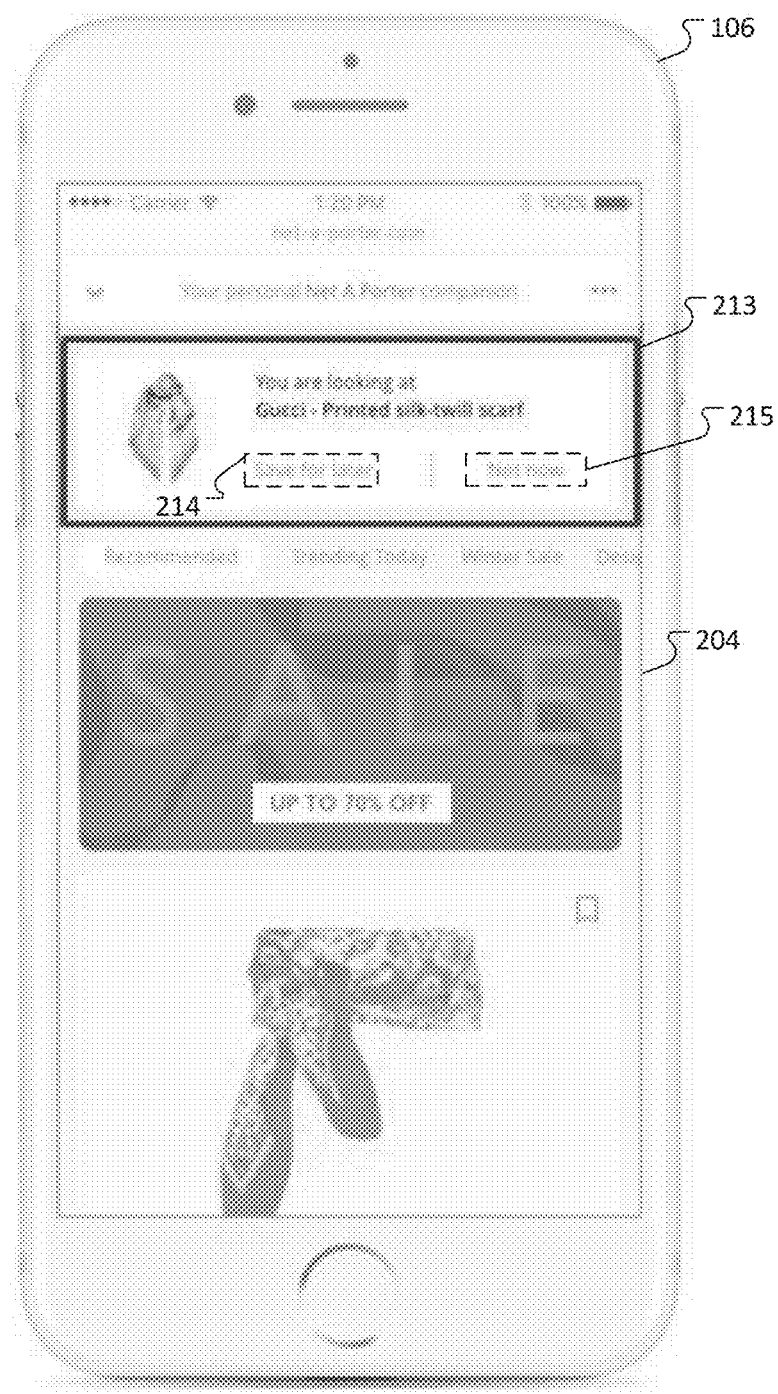

As shown in FIG. 5, interface 204 can generate a product notification 213 that includes a save feature 214 and a dismiss or "Not now" feature 215. In general, interface 204 can be configured to enable use of save feature 214 for bookmarking certain user defined product items. User selection of "Not now" feature 215 can dismiss a product notification 213 for a single view of a notification. User selection of save feature 215 causes the product shown via product notification 213 to be saved or bookmarked for later access by a user.

Bookmarked product items can be accessed via a user selectable feature of interface 204 that may be identified as "My Favorites," as "My Picks," or as any other related text that indicates a listing of saved items. In general, save feature 214 can be used to track or maintain a listing of product categories or product items a user has viewed through interface 204 and via browser 119. In some implementations, system 100 can analyze saved content data, such as items saved in a user's My Picks list, to determine or infer one or more related content item categories or content items that might be of interest to a user.

For example, system 100 can be configured such that saved My Picks data, e.g., user aggregated data in a geographical area, is analyzed to suggest product categories to users that are physically located in the geographical area. In some implementations, system 100 can include cross-device sharing functionality based on product or category information that is saved by the user as "My Picks" data. For example, saved My Picks data can be shared between two or more devices by identifying and authenticating certain users. Users can be identified or authenticated based on a user defined multi-word key (e.g., two or more key words), such as a password or passcode. After user authentication at system 100, system 100 can then cause data, such as product items saved by a user as My Picks data, to be shared across two or more user devices 106 for access to the user.

Figure 6:
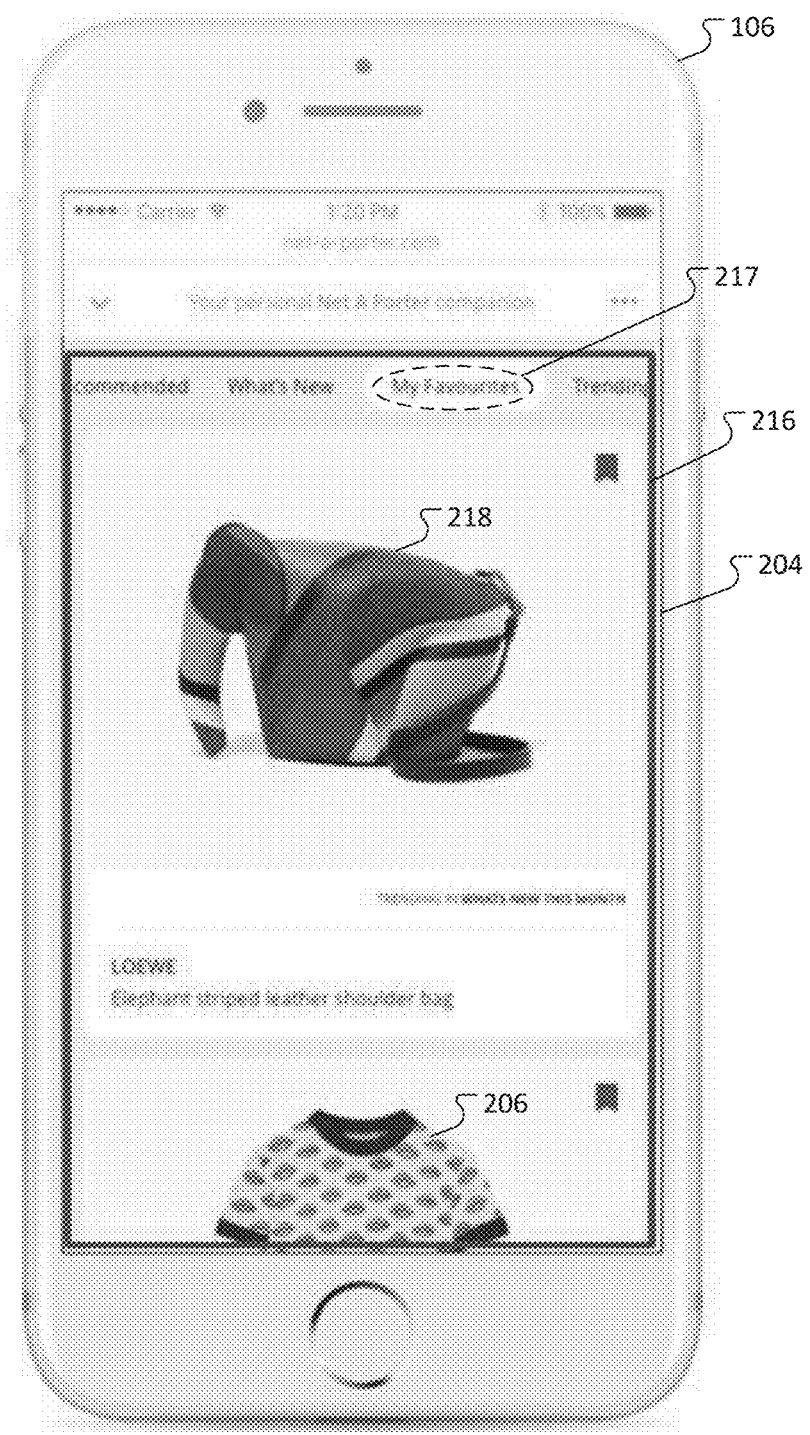

In the implementation of FIG. 6, interface 204 can include at least two product items 206 and 218 that have been saved to a "My Favorites" (e.g., My Picks) listing 217 using save feature 214. Use of save feature 214 to associate certain content items with an example My Picks listing allows users to access saved items and to complete purchase of these saved items at a later time period. In some implementations, an example My Picks listing can be accessed (e.g., via a single device, rather than across multiple devices) without user login or authentication.

System 100 can be configured to suggest or recommend certain products to a user based on the system having received or learned one or more preferences of the user. In some implementations, product suggestions that are provided as recommendations to a user via system 100 may be sourced from one or more My Pick items that are included in a user's My Picks listing. For example, system 100 can analyze saved data for a user's My Picks listing to determine a product/item interest of the user. System 100 can then suggest or recommend one or more product or content items based on the determined product/item interest of the user.

In some implementations, a My Picks feature of interface 204 can be integrated with wish list functionality, or an example saved items list, of a provider specific website 112. For example, website 112 can be associated with an example e-commerce platform that offers wish list functionality. In some implementations, system 100 can provide an example application program interface (API) that the e-commerce platform can use to access content items stored in a user's My Picks listing of interface 204. Hence, in this implementation, the provider's e-commerce service and the My Picks service can be synchronized to provide a more integrated and improved user/customer product purchase experience.

Figure 7:
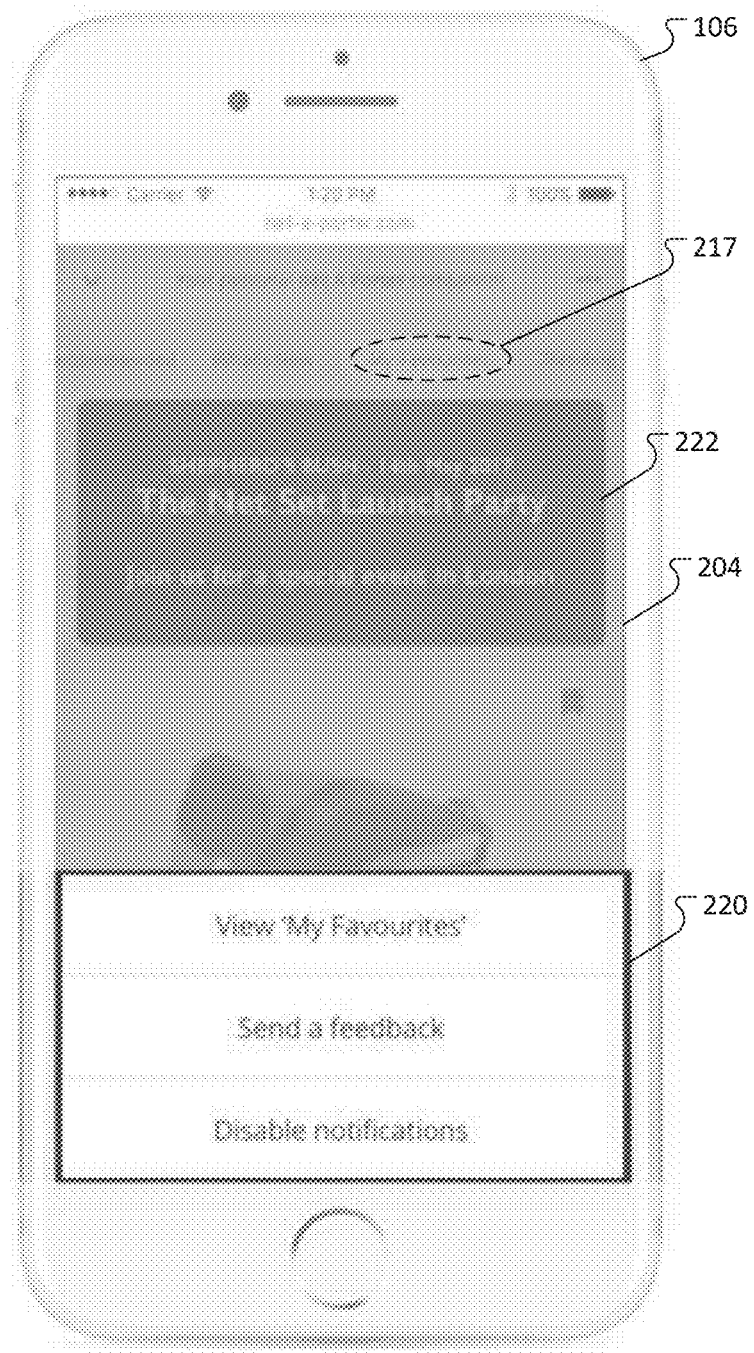

In the implementation of FIG. 7, interface 204 includes sub-menu 220 and event notification 222. Sub-menu 220 can be accessed in response to user selection of indicator 207 discussed above with reference to FIG. 3A. Sub-menu 220 includes a selectable option that enables a user to view one or more content items that have been saved as "My Favourites" (e.g., My Picks items). Sub-menu 220 also includes a selectable option that, upon selection by a user, launches an opinion panel for enabling the user to provide feedback on one or more personalized interfaces generated by system 100. Sub-menu 220 further includes a selectable option for disabling one or more notifications that may be generated by interface 204.

Figure 8B:
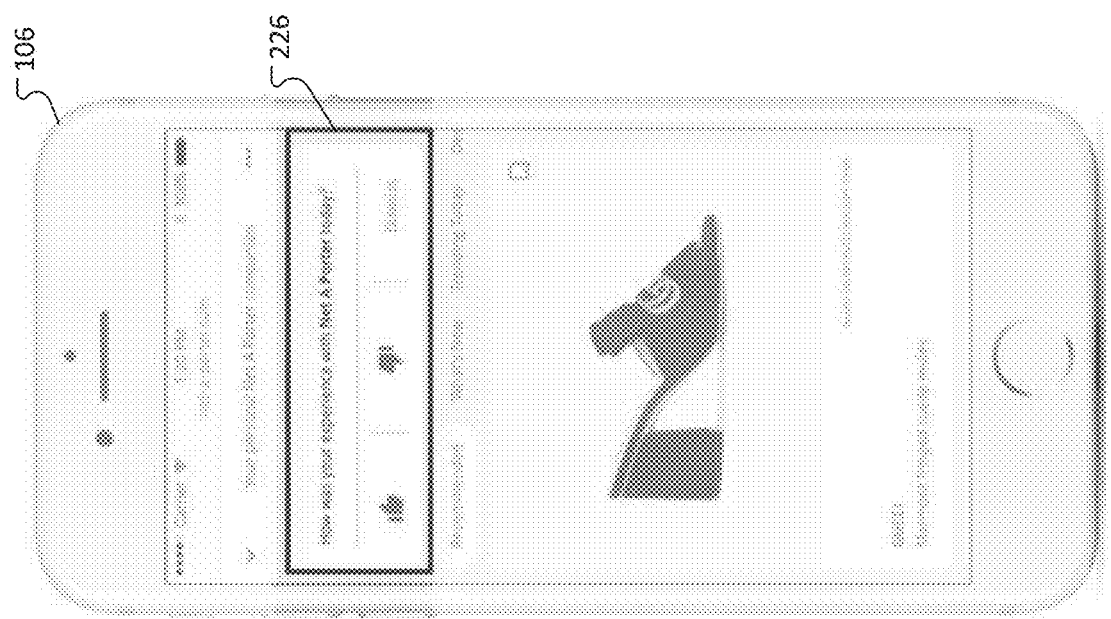
FIGS. 8A and 8B each show an example of user interface for receiving feedback from a user.
Figure 8A:
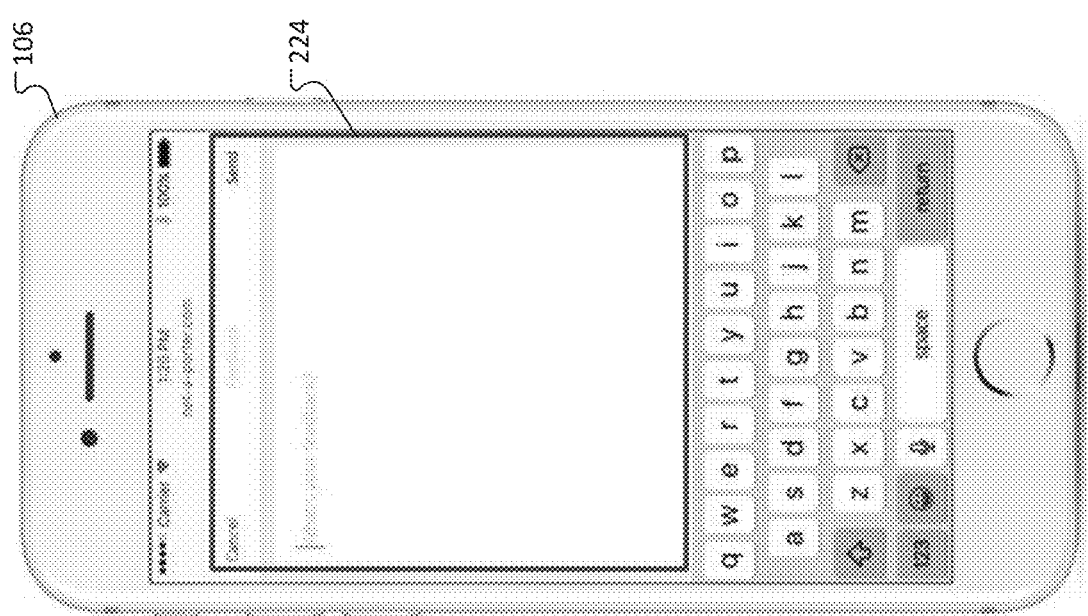

FIGS. 8A and 8B each show an example user interface for receiving feedback from a user. In the implementation of FIG. 8A, system 100 generates an example interface that includes a user input form that can receive text-based input entries from a user. Text input received from the user can include user feedback and other user opinions about a user's experience(s) when interacting with features of interface 204, or with features of other personalized interfaces generated by system 100. In some implementations, user responses can be posted to an opinion dashboard of system 100.

In the implementation of FIG. 8B, system 100 generates at least one poll question that can be presented to a user at random periods when the user interacts with interface 204, or another example interface of system 100. For example, a feedback feature 226 can include an example poll question and at least one user response option. The poll question can be generated at a sample rate of one poll question every one day, every 15 days, or every 30 days.

In some implementations, the text displayed for an example poll question can be "How was your experience with [brand] today?" While in other implementations, the text displayed for an example poll question can be any of a multitude of text for crafting poll questions that can be used to obtain user feedback or other user opinions about personalized user-specific interfaces generated by system 100.

Feedback feature 226 can also include multiple user response options that can be selected by a user. For example, using response options available via feedback feature 226, a user can respond with a positive sentiment (e.g., thumbs up), a negative (e.g., thumbs down), or a dismiss sentiment to disregard a particular poll question. User selection of either the positive sentiment or the negative sentiment causes a "Thank you for your feedback" notification to be shown to the user.

Figure 9:
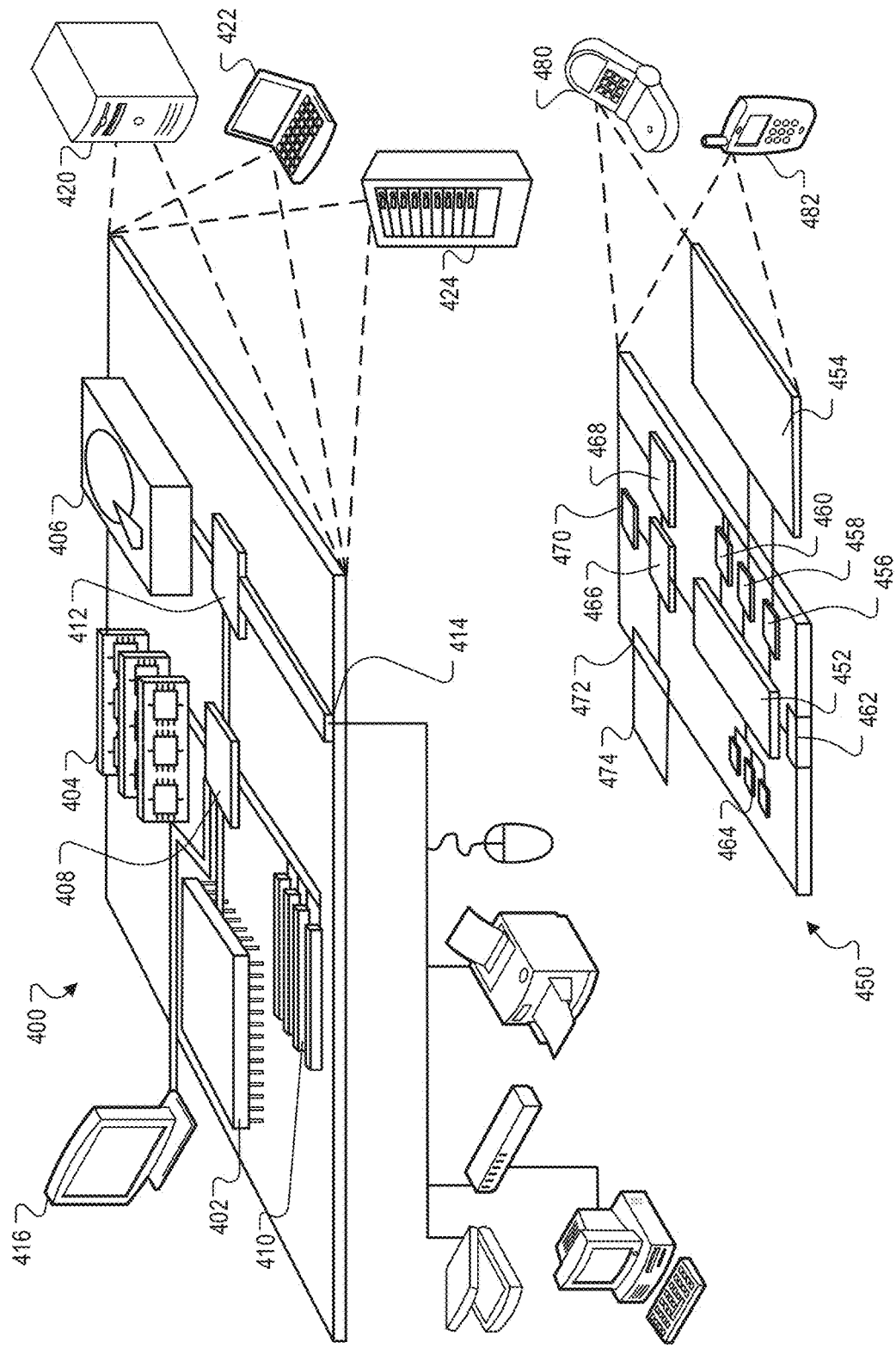
FIG. 9 is a block diagram of a computing system that can be used in connection with computer-implemented methods described in this specification.

FIG. 9 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 606, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 600 may be connected, with each device providing portions of the necessary operations, e.g., as a server bank, a group of blade servers, or a multi-processor system.

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416, e.g., through a graphics processor or accelerator, and to high-speed expansion ports 410, which may accept various expansion cards (not shown). In the implementation, low-speed controller 412 is coupled to storage device 406 and low-speed expansion port 414. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication, e.g., via a docking procedure, or for wireless communication, e.g., via Bluetooth or other such technologies.

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound, e.g., voice messages, music files, etc., and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

A server can be realized by instructions that upon execution cause one or more processing devices to carry out the processes and functions described above. Such instructions can comprise, for example, interpreted instructions such as script instructions, or executable code, or other instructions stored in a computer readable medium. A server can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

Although an example processing system has been described, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of nonvolatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Certain features that are described that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Other implementations are within the scope of the following claims.

The invention claimed is:

1. A computer-implemented method, comprising:
   obtaining, by an interface generator of a server, a respective dataset for each of a plurality of users, each respective dataset indicating one or more content preferences for a user;
   obtaining, by the interface generator, provider data that describes a plurality of product groups of a content page;
   processing, by an event processing pipeline of the interface generator, a dataset for a first user against provider data about a product group accessible at the content page, comprising:
   storing an association between information about real-time browsing activities that indicate selection by the first user of the product group displayed at the content page and the dataset indicating content preferences for the first user in a structured dataset, wherein the structured dataset comprises session data, said session data comprising real-time browsing activities related to data events for the first user;
   based on the structured dataset, generating, by the interface generator, a user-specific interface for output at a user device in response to interaction by the first user with a particular item of the content page,
   wherein the user-specific interface is generated by dynamically altering content of the content page to present at least a portion of content, comprising items of the product group, that is customized to the first user.

2. The method of claim 1, further comprising:
   storing the provider data about the product groups in a products database of the interface generator; and
   storing at least a subset of the respective datasets in a user preferences database of the interface generator.

3. The method of claim 1, wherein generating the user-specific interface comprises:
   analyzing the stored provider data and the subset of respective datasets;
   in response to analyzing, generating a user preference model using modeling logic of the interface generator; and
   generating the user-specific interface based on the user preference model, wherein the user preference model encodes an association between at least one content preference of the first user and at least one product indicated by the provider data.

4. The method of claim 1, wherein the user-specific interface comprises a graphical display that includes representations of multiple products that are offered for procurement from a provider.

5. The method of claim 1, wherein the user-specific interface corresponds to a personalized portal that is generated for display as an inline frame, the personalized portal comprising a plurality of user-specific image content.

6. The method of claim 5, wherein the user-specific interface is configured for embedding, based on the inline frame, within a web resource generated by a provider.

7. The method of claim 1, wherein the user-specific interface:
   i) displays, to the first user, a personalized selection of products and product categories related to the provider; and
   ii) enables the first user to procure at least one product from a particular product category.

8. An electronic system, comprising:
   one or more processing devices;
   one or more machine-readable storage devices storing instructions that are executable by the one or more processing devices to cause performance of operations comprising:
   obtaining, by an interface generator of a server, a respective dataset for each of a plurality of users, each respective dataset indicating one or more content preferences for a user;
   obtaining, by the interface generator, provider data that describes a plurality of product groups of a content page;
   processing, by an event processing pipeline of the interface generator, a dataset for a first user against provider data about a product group accessible at the content page, comprising:
      storing an association between information about real-time browsing activities that indicate selection by the first user of the product group displayed at the content page and the dataset indicating content preferences for the first user in a structured dataset, wherein the structured dataset comprises session data, said session data comprising real-time browsing activities related to data events for the first user;
   based on the structured dataset, generating, by the interface generator, a user-specific interface for output at a user device in response to interaction by the first user with a particular item of the content page,
   wherein the user-specific interface is generated by dynamically altering content of the content page to present at least a portion of content, comprising items of the product group, that is customized to the first user.

9. The electronic system of claim 8, wherein the operations further comprise:
   storing the provider data about the product groups in a products database of the interface generator; and
   storing at least a subset of the respective datasets in a user preferences database of the interface generator.

10. The electronic system of claim 8, wherein generating the user-specific interface comprises:
    analyzing the stored provider data and the subset of respective datasets;
    in response to analyzing, generating a user preference model using modeling logic of the interface generator; and
    generating the user-specific interface based on the user preference model, wherein the user preference model encodes an association between at least one content preference of the first user and at least one product indicated by the provider data.

11. The electronic system of claim 8, wherein the user-specific interface comprises a graphical display that includes representations of multiple products that are offered for procurement from a provider.

12. The electronic system of claim 8, wherein the user-specific interface corresponds to a personalized portal that is generated for display as an inline frame, the personalized portal comprising a plurality of user-specific image content.

13. The electronic system of claim 12, wherein the user-specific interface is configured for embedding, based on the inline frame, within a web resource generated by the provider.

14. The electronic system of claim 8, wherein the user-specific interface:
    i) displays, to the first user, a personalized selection of products and product categories related to the provider; and
    ii) enables the first user to procure at least one product from a particular product category.

15. One or more machine-readable storage devices storing instructions that are executable by one or more processing devices to cause performance of operations comprising:
    obtaining, by an interface generator of a server, a respective dataset for each of a plurality of users, each respective dataset indicating one or more content preferences for a user;
    obtaining, by the interface generator, provider data that describes a plurality of product groups of a content page;
    processing, by an event processing pipeline of the interface generator, a dataset for a first user against provider data about a product group accessible at the content page, comprising:
       storing an association between information about real-time browsing activities that indicate selection by the first user of the product group displayed at the content page and the dataset indicating content preferences for the first user in a structured dataset, wherein the structured dataset comprises session data, said session data comprising real-time user browsing activities related to data events for the first user;
    based on the structured dataset, generating, by the interface generator, a user-specific interface for output at a user device in response to interaction by the first user with a particular item of the content page,
    wherein the user-specific interface is generated by dynamically altering content of the content page to present at least a portion of content, comprising items of the product group, that is customized to the first user.

16. The machine-readable storage devices of claim 15, wherein the operations further comprise:
    storing the provider data about the product groups in a products database of the interface generator; and
    storing at least a subset of the respective datasets in a user preferences database of the interface generator.

17. The machine-readable storage devices of claim 15, wherein generating the user-specific interface comprises:
    analyzing the stored provider data and the subset of data;
    in response to analyzing, generating a user preference model using modeling logic associated with an interface generator; and
    generating the user-specific interface based on the user preference model, wherein the user preference model encodes an association between at least one preference of the first user and at least one product indicated by the provider data.

18. The machine-readable storage devices of claim 15, wherein the user-specific interface comprises a graphical display that includes representations of multiple products that are offered for procurement from a provider.

19. The machine-readable storage devices of claim 15, wherein the user-specific interface corresponds to a personalized portal that is generated for display as an inline frame, the personalized portal comprising a plurality of user-specific image content.

\* \* \* \* \*